United States Patent [19]

Renkema et al.

[11] Patent Number: 5,688,733
[45] Date of Patent: Nov. 18, 1997

[54] CATALYST AND PROCESS FOR A ZIEGLER POLYMERISATION

[75] Inventors: Jacob Renkema, Sittard; Jeroen H. G. Konings, Stein, both of Netherlands

[73] Assignee: DSM N.V., Heerlen, Netherlands

Related U.S. Application Data

[63] Continuation of PCT/NL93/00255 Dec. 1, 1993.

[21] Appl. No.: 457,669

[22] Filed: Jun. 1, 1995

[30] Foreign Application Priority Data

Dec. 21, 1992 [BE] Belgium ................... 9201115

[51] Int. Cl.$^6$ .............. B01J 31/00; C08F 9/02; C08F 9/44; C08F 9/00
[52] U.S. Cl. .............. 502/103; 502/117; 502/123; 502/167; 526/161; 534/15; 556/42; 556/51; 556/57
[58] Field of Search ............ 502/167, 103, 502/123; 526/161, 103, 167; 534/15; 556/42, 51, 57

[56] References Cited

U.S. PATENT DOCUMENTS

| | | | |
|---|---|---|---|
| 3,394,156 | 7/1968 | Kornicker et al. | 556/51 |
| 4,435,552 | 3/1984 | Evens | 502/154 |
| 4,758,539 | 7/1988 | Brown et al. | 556/51 |
| 5,086,023 | 2/1992 | Smith | 502/103 |
| 5,194,642 | 3/1993 | Winter et al. | 556/51 |
| 5,318,935 | 6/1994 | Canich et al. | 556/51 |
| 5,364,916 | 11/1994 | Renkema et al. | 502/167 |

FOREIGN PATENT DOCUMENTS

| | | | |
|---|---|---|---|
| 213425 | 3/1956 | Australia | 556/51 |
| 0 518 415 | 12/1992 | European Pat. Off. | |
| 269387 | 6/1989 | Germany | 556/51 |

OTHER PUBLICATIONS

L.R. Chamberlain et al., J. Chem. Soc., Chem. Commun., 1986, pp. 1203–1205.

L.R. Chamberlain et al., Polyhedron, vol. 8, No. 3, pp. 341–349 Aug. 1989.

Y.-W. Chao et al., Inorg. Chem., vol. 28, No. 20, pp. 3860–3868 1989.

Y.-W. Chao et al., Inorg. Chem., vol. 29, No. 23, pp. 4592–4594 1990.

Y.-W. Chao et al., J. Am. Chem. Soc., vol. 113, No. 16, pp. 6326–6328 1991.

N. Bryson et al., Organometallics, vol. 10, No. 9, pp. 3389–3392 Sep. 1991.

D.D. Devore E.A., Complexes of (Arylimido) vanadium (V), Synthetic, Structural, Spectroscopic, and Theorethical Studies of V(Ntol)CL3 and Derivatives, *J. Am. Chem. Soc.*, (1987) vol. 109, pp. 7408–7416.

A. Clearfield et al., J. Inorg. Nuc. Chem., 1963, vol. 25, pp.237–240.

*Primary Examiner*—Glenn A. Caldarola
*Assistant Examiner*—J. Pasterezyk
*Attorney, Agent, or Firm*—Cushman Darby & Cushman IP Group of Pillsbury Madison & Sutro, LLP

[57] ABSTRACT

The present invention relates to a catalyst. The catalyst contains a transition metal-imidoaryl complex which contains at least one amido group bound to the transition metal and wherein the aryl group is a 2,6-di-substituted phenyl group. The catalyst can be used in polymerizing olefins. The transition metal is chosen from groups 3–6 of the periodic table.

37 Claims, No Drawings

CATALYST AND PROCESS FOR A ZIEGLER POLYMERISATION

RELATED APPLICATIONS

This application is a continuation application of PCT/NL93/00255 filed Dec. 1, 1993.

FIELD OF THE INVENTION

The invention relates to a catalyst that is suitable for the preparation, via a Ziegler polymerization, of an olefin polymer, comprising an organometallic compound and a transition metal-imidoaryl complex.

BACKGROUND OF THE INVENTION

Such a catalyst is known from U.S. Pat. No. 5,086,023, which describes a catalyst for the preparation of an ethylene-propylene-diene polymer in which the catalyst contains the transition metal vanadium. The catalyst used therein contains a vanadium trichloride-imido-para-tolyl complex.

A drawback of such a catalyst for use in a Ziegler polymerization of an olefin is that the activity is low (approx. a factor of 3 lower relative to the catalyst according to the known relevant state of the art (as also appears from the results of such a catalyst presented in U.S. Pat. No. 5,086,023)).

SUMMARY AND OBJECTS OF THE PRESENT INVENTION

According to the invention, with a new catalyst, to be described below, a substantially increased yield of polymer is obtained (relative to the amount of transition metal used).

The catalyst according to the invention is characterised in that the transition metal-imidoaryl complex contains at least one amido group bound to the transition metal, the aryl group in the complex being an o,o-disubstituted phenyl group. As used herein, the term o,o-disubstituted phenyl group designates a 2,6-disubstituted phenyl group.

An amido group is here understood to be a group that is originating from an amine via separation of a hydrogen atom; in the context of the present invention the amido group is a nitrogen containing group, in which the nitrogen atom is formally single bonded to the transition metal.

Surprisingly it has been found that because of the combination of an amido group bound to the transition metal and an imido, o,o-disubstituted phenyl group a unique catalyst is obtained which presents both a high activity and a good stability; i.e. not only is the initial activity high, the activity profile is also much more constant. The activity profile changes from a 'decay type' to 'active for a long time'. Because of the presence of such specific groups, which are not mentioned in the prior state of the art, a catalyst is obtained that shows catalytic behaviour that differs substantially from that of the transition-metal compounds that have commonly been used in Ziegler chemistry until now. This is apparent from for example different yields (per unit of transition metal), different polymer configurations and different incorporation percentages when more olefines are used, so that it must be concluded that there is a different catalytic center.

The high activity described above is not obtained if, instead of the amido group, alkoxide or halogen groups are bound to the transition metal in the complex.

The stability of the catalyst described above is not obtained if the aryl group of the imidoaryl complex is different from the group according to the invention, namely an o,o-disubstituted phenyl group. In particular this applies in the case of the use of the trichloro-vanadium-imido-para-tolyl complex as practised in the aforementioned U.S. Pat. No. 5,086,023.

DETAILED DESCRIPTION OF THE INVENTION

The catalyst according to the present invention is suitable for the preparation of an olefin polymer via Ziegler polymerization and comprises a transition metal-imidoaryl complex which contains at least one amido group bound to the transition metal and wherein the aryl group is an o,o-disubstituted phenyl group.

More particularly, the amido group in the complex has the formula $—NR_1R_2$, where $R_1$ and $R_2$, independently of one another, are an alkyl group, an alkenyl group, an aryl group or a silicon-containing hydrocarbyl group, each containing generally from 1–20 C-atoms.

Here and hereafter such a transition metal-imidoaryl complex is understood to be a group of compounds having the following general formula:

$$R-N=M(X)_n(Y)_m(NR_1R_2)_p \qquad (1)$$

where:
R: stands for an o,o-disubstituted phenyl group;
M: stands for a transition metal of groups 3–6;
X: stands for a halogen group;
Y: stands for an alkoxy group, an aryloxy group, an amide group or a silicon containing hydrocarbyl group or a different ligand group to be described below;
$R_1$ and/or $R_2$: stand for an alkyl group, an alkenyl group, an aryl group or a silicon-containing hydrocarbyl group;
n: 0–2; (this being dependent on the valency of
m: 0–2; the R–N=M group, i.e. n+m+p=valency of
p: 1–3. M-2)
(R–N=: stands for the imidoaryl ligand).

The individual groups in the complex will be discussed below.

The aryl group in the complex (R in formula 1) consists of an o,o-disubstituted phenyl group, which optionally may also be substituted at the meta- or para-position. The substituents present at the o(ortho-)-positions of the phenyl group are alkyl groups, whether or not substituted, having 1–20 C-atoms. Preferred are substituents having 1–8 C-atoms, such as methyl, ethyl, isopropyl and isobutyl. More preferably the ortho-substituent is a methyl or isopropyl group. Suitable substituents at the meta- and para-positions of the R group may be: alkyl, aralkyl, alkoxide, aryloxide, halogen, amino, nitro, thiol and carboxyl. Such and other substituents are known to a person skilled in the art and their suitability can be tested in a simple manner.

The transition metal in the complex (M in formula 1) is chosen from groups 3–6 of the Periodic System of the Elements (using the new IUPAC list as shown on the inside page of the Handbook of Chemistry, 70th Edt., 1989–90). Preferably the transition metal is chosen from the group comprising Ti, Zr, V, Nb, Cr and Mo. More preferably the transition metal is Ti or V. For the preparation of amorphous copolymers it is most preferable to use V as the transition metal.

The amido group in the catalyst and in particular the $—NR_1R_2$ group is at least singly present (p=1 in the general formula 1), but several amido groups are also suitable. Both the $R_1$ group and the $R_2$ group in the amido group are, independently of one another, an alkyl group, an alkenyl group, an aryl group or a silicon-containing hydrocarbyl group, whether or not substituted, each containing 1–20 C-atoms. Preferably, an alkyl- or alkenyl group contains 1–8 C-atoms; an arylgroup preferably 6–15 C-atoms.

Methyl, ethyl, propyl, isopropyl and higher homologues can for example be mentioned as the alkyl group. Vinyl, 1-propenyl, allyl and 1,3-butadienyl can, for example, be mentioned as the alkenyl group. Tolyl, phenyl and naphthalyl can, for example be mentioned as the aryl. Trimethylsilyl, triethylsilyl, dimethylethylsilyl and analogous groups can be mentioned as the silicon-containing hydrocarbyl group. The alkyl, alkenyl, aryl or silicon-containing hydrocarbyl groups may also contain substituents such as an aryl or alkyl group, an alkoxide, aryloxide, halogen, amino, nitro, thiol or carboxyl group.

Preferably $R_1$ and $R_2$ are an aryl group and more preferably $R_1$ and $R_2$ are a phenyl group.

The amido group may also be a heterocyclic system, such as an imidazole group, a carbazole group or a piperidine group.

One or two halogen atoms may also be bound to the transition metal (X in the general formula 1), in which case a choice can be made from among F, Cl, Br and I.

Preferably the complex contains at least 1 halogen group, more preferably at least 1 chlorine group, which is bound to the transition metal (i.e. $n \geq 1$). Mixtures of the aforementioned halogens are also suitable.

In the above general formula 1, Y can be chosen from the group comprising alkoxide, aryloxide, amine, amide, an S or a P compound, a cyclopentadienyl or a silicon-containing hydrocarbyl group, mixtures being possible too.

Transition metal-imidoaryl complexes, notably in the form of vanadium-imidoaryl complexes, are known as such; and reference is made to D. D. Devore et al. in J.Am. Chem. Soc., Vol. 109 (24), pp. 7408–16 (1987).

This article also indicates how complexes containing vanadium as the transition metal can be prepared. The reaction of VOCl with para-substituted arylisocyanates can be mentioned here as an example. For the preparation of complexes based on the other transition metals specific preparation methods are known in the literature. Reference can be made to the article by W. A. Nugent and B. L. Haymore in Coord. Chem. Rev., 31 (1990) pp. 123–175.

The amido complexes of the invention can be prepared in several ways. The following routes can, for example, be used:

a) the amido group is obtained through a salt-exchange reaction between a transition metal-imidoarylhalide and an alkali metal amide (M—$NR_1R_2$, where M is for example Li, Na or K), b) the amido group is obtained via a reaction of a transition metal-imidoarylhalide with an amine in the presence of a halogen catcher (e.g. a Lewis base such as triethylamine), c) similar to what has been said above, via reaction with a substituted amine, the substituent being a good leaving group, such as trimethylsilicon.

Several routes for the synthesis ace hence available and known to a person skilled in the art.

The catalyst also contains an organometallic compound of group 1, 2, 12 or 13 as a cocatalyst (again according to the new IUPAC list). At least one hydrocarbon group is bound directly to the metal atom via a carbon atom.

The compounds of sodium, lithium, zinc and magnesium and in particular aluminium can be mentioned as compounds of such metals in which at least one hydrocarbon group is bound directly to the metal ion via a carbon atom. The hydrocarbon group bound to the metal atom in these compounds preferably contains between 1 and 30 carbon atoms, and more particularly 1–10 carbon atoms. Examples of suitable compounds are amylsodium, butyllithium, diethylzinc, butylmagnesium chloride and dibutylmagnesium. Aluminium compounds, in particular trialkylaluminum compounds (such as triethylaluminum), alkylaluminum hydrides (such as diisobutylaluminum hydride), alkylalkoxyaluminium compounds and halogen-containing aluminum compounds (such as diethylaluminum chloride, diisobutylaluminum chloride, monoethylaluminum chloride and ethylaluminum sesquichloride), are preferred. Mixtures of such compounds can also be used.

The molar ratio of the organometallic compound and the transition-metal complex can be varied within a wide range. In general this ratio will lie between 1:1 and 1500:1. Preferably it is chosen to be between 2:1 and 300:1, and more particularly between 3:1 and 50:1.

The catalyst can be added to a polymerization reactor both in dissolved condition (in which case a solvent or dispersing agent that is also used in the corresponding liquid-phase polymerization is preferably chosen) and in a form with which at least one of the components is applied to a carrier. Several techniques for achieving the latter option, which are known per se, are known to a person skilled in the art. Silica, alumina, zeolite, $MgCl_2$, etc. can for example serve as the carrier. This so-called heterogenization of the catalyst makes it possible to carry out the polymerization in a slurry or as a gas-phase process.

The catalyst can be modified in several ways to make it more suitable for the preparation, via a Ziegler polymerization, of an olefin polymer.

For example the catalyst may also contain a promoter, that is a compound that improves a catalyst's polymerization yield. Halogenated compounds are particularly suitable promoters. Preference is given to the use of specific compounds with a low halogen content as promoters in the preparation of copolymers of ethylene so as to avoid too high a halogen concentration in the polymer to be prepared. Substantially and preferably, these compounds contain at most 2 halogen atoms per molecule, for example alkyl or alkoxyalkyl esters of phenyl mono- or dihalogen acetic acid. Reference can be made to U.S. Pat. No. 4,435,552 for these and other suitable promoters.

The catalyst of the invention may also contain a Lewis acid. Such an acid is also capable of increasing the activity of the catalyst according to the invention. Examples of suitable Lewis acids include, but are not limited to: $AlCl_3$, $AlBr_3$, $GaCl_3$, $GaBr_3$, $BCl_3$ or $SiCl_4$.

Another possibility is that the catalyst of the present invention contains a Lewis base. Like a Lewis acid, such a compound is capable of intensifying the catalytic effect. Examples of Lewis bases include, but are not limited to esters, ethers, ketones, alcohols, amines and the like.

Another possibility of influencing the catalytic activity is to (partially) replace the halogen group (or groups) X of the transition metal-imidoaryl complex by a different ligand (that is, the Y group of general formula 1). Examples of such ligands include, but are not limited to:

alkoxy group,
aryloxy group,
amine group or amide group,
S compound (such as e.g. sulphide, sulphite, sulphate, thiol, sulphinate),
P compound (such as e.g. phosphine, phosphite, phosphate),
cyclopentadienyl, whether or not substituted,
a silicon-containing hydrocarbyl compound.

The above modifications can be applied to the catalyst itself or they can be carried out during the polymerization using methods known in the art.

The present invention also relates to a process with which a catalyst according to the invention is used in the preparation, via a Ziegler polymerization, of an olefin polymer, in particular a polymer based on an olefin chosen from the group comprising α-olefin, non-terminal olefins or diolefins. Mixtures thereof may also be used.

In particular the invention relates to a process for polymerising α-olefins. The α-olefins are preferably chosen from the group comprising ethylene, propylene, butylene, pentene, heptene and octene; mixtures thereof may also be used. More preferably ethylene and/or propylene is used as the α-olefin. The use of such olefins leads to the formation of both high-density and low-density crystalline polyethylene homopolymers and copolymers (HDPE, LDPE, LLDPE, etc.) and polypropylene homopolymers and copolymers (PP and EMPP). The monomers required for such products and the processes to be used are known to a person skilled in the art.

The process according to the invention is also pre-eminently suitable for the preparation of amorphous or rubbery copolymers based on ethylene and a different α-olefins. Preferably propylene is used as the different α-olefins, which results in the formation of EPM rubber. It is also possible to use a diene in addition to ethylene and the other α-olefin, which results in the formation of a so-called EADM rubber, in particular EPDM (ethylene-propylene-diene rubber).

An amorphous copolymer is here and hereinafter understood to be a copolymer which at room temperature and higher temperatures has a crystallinity of at most 5%, measured with the aid of DSC (differential scanning calorimetry). Preferably the amorphous copolymer has a crystallinity of at most 1%.

The olefin can be polymerized in a known manner, both in the gas phase and in a liquid reaction medium. Both solution and suspension polymerization are suitable for the latter option. The process according to the invention will be elucidated below with reference to the preparation of EP(D)M, which is known per se. For the preparation of other polymers based on an olefins reference is emphatically made to the many publications on this subject.

α-olefins efines that are suitable for use as the monomer in addition to ethylene in the preparation of an EA(D)M polymer are: propylene, 1-butylene, 1-pentene, 1-hexene, 1-octene or the branched isomers thereof, such as 4-methyl-1-pentene, and furthermore styrene, α-methyl-styrene. Mixtures of these alkenes can also be used, in which case propylene and/or 1-butylene is preferred.

A polyunsaturated compound that is able to introduce unsaturation into the polymer is to be used as the diene in such an amorphous copolymer; this compound contains at least two C=C bonds and may be aliphatic or alicyclic. Aliphatic polyunsaturated compounds generally contain between 3 and 20 carbon atoms; the double bonds may be both conjugated and, preferably, non-conjugated. Examples thereof include: 1,3-butadiene, isoprene, 2,3-dimethyl-1,3-butadiene, 2-ethyl-1,3-butadiene, piperylene, myrcene, allene, 1,2-butadiene, 1,4,9-decatrienes, 1,4-hexadiene, 1,5-hexadiene and 4-menthyl-1,4-hexadiene. Alicyclic polyunsaturated compounds, which may or may not contain a bridging group, may be monocyclic or polycyclic. Examples of such compounds include, but are not limited to norbornadiene and its alkyl derivatives; the alkylidene-norbornenes, in particular the 5-alkylidene-2-norbornenes, in which the alkylidene group contains between 1 and 20, preferably between 1 and 8 carbon atoms; the alkenyl-norbornenes, in particular the 5-alkenyl-2-norbornenes, in which the alkenyl group contains between 2 and 20, preferably between 2 and 10, carbon atoms, for example vinyl-norbornene, 5-(2'-methyl-2'-butenyl)-2-norbornene and 5-(3'-methyl-2'-butenyl)-2-norbornene, dicyclopentadiene and the polyunsaturated compounds of bicyclo-(2,2,1)-heptane, bicyclo-(2,2,2)-octane, bicyclo-(3,2,1)-octane and bicyclo-(3,2,2)-nonane, where at least one of the rings is unsaturated. In addition, use can be made of compounds like 4,7,8,9-tetrahydroindene and isopropylidenetetrahydroindene. In particular use is made of dicyclo-pentadiene, 5-methylene- or 5-ethylidene-2-norbornene, or 1,4- hexadiene. Mixtures of the compounds described above can also be used.

The diene can be present in the copolymer in amounts up to 30 wt. %, preferably however up to at most 10–15 wt. %.

In addition to or instead of the diene an unsaturated compound having one or more functional groups, such as halogen atoms, —OH, —OR, —COOH, —COOR or —NH$_2$ groups, may optionally be incorporated in the copolymer in an amount up to 20 wt. %.

The molar ratio of the monomers used in the present invention is dependent on the desired composition of the polymer. Because the polymerization rates of the monomers differ substantially no generally applicable ranges of molar ratios can be given. However, in the case of the copolymerization of ethylene and propylene molar ratios of between 1:1 and 1:5 will in general, be chosen. If a polyunsaturated compound is copolymerised, its molar ratio relative to ethylene will usually be between 0.0001:1 and 1:1.

The polymerization reaction is generally carried out at a temperature between –40° and 200° C., preferably between 10° and 80° C. The pressure will usually be 0.1°–5 MPa, but higher or lower pressures can also be used. Preferably the process is carried out in continuous mode, but it can also be carried out in semi-continuous mode or batchwise.

The residence time of the polymerization reaction used may vary from a few seconds to several hours. A residence time of between a few minutes and an hour is usually preferred.

The polymerization may take place in a liquid that is inert relative to the catalyst, for example one or more saturated aliphatic hydrocarbons (such as butane, pentane, hexane, heptane, pentamethylheptane or petroleum fractions); aromatic hydrocarbons (for example benzene or toluene) or halogenated aliphatic or aromatic hydrocarbons (for example tetrachloroethylene). The temperature and pressure used can be such that one or more of the monomers used, in particular the α-olefin, for example propylene, is liquid and is present in such a large amount that it serves as a dispersing agent. There is then no need for a different dispersing agent. The process according to the invention can be carried out both in a polymerization reactor filled with gas and liquid and in a reactor filled entirely with liquid. Use of a heterogenized catalyst of the present invention makes it possible to carry out the polymerization process in suspension or in the gas phase.

The molecular weight can be set via techniques known to a person skilled in the art. In particular it can be done by using chain-length regulators, such as diethylzinc and preferably hydrogen. Very small amounts of hydrogen already have sufficient effect on the molecular weight.

In the case of liquid-phase processes, the catalyst of the present invention is suitable for use at room temperature or even higher temperatures, so that the heat of reaction can be discharged in a more efficient manner. As is known, this can be done via strong cooling of the feed to the reactors or via evaporation of a portion of the reaction medium. After polymerization the polymer can be worked up in different manners. Both evaporation of the solvent and steam-coagulation are suitable in the case of liquid-phase processes.

Amorphous copolymers obtained using the process of the present invention generally contain between 25 and 85 wt. % ethylene. Products with an ethylene content of between 40 and 75 wt. % are preferred. Such copolymers are suitable for a variety of applications, for example for the manufacture of hoses, conveyor belts and pre-formed seals. Optionally, the copolymers can be vulcanized according to the standard methods known in the art, using free radical supplying substances such as peroxides or using sulphur.

In order to make the product processable as a rubber the copolymer can be mixed with oil. This is preferably done during the polymerization. Adding agents to the copolymer to obtain a so-called friable bale is known. This can be done, for example by adding, for example, talc or by using a system such as that described in EP-A-427,339. The composition described therein, comprising an inorganic partitioning agent, a thickener and an anionic dispersant, is very suitable for use with the products of the present invention.

EXAMPLES

The invention will be described below with reference to the following examples and comparative experiments, without being limited thereto.

Cat. 1=$VOCl_3$
Cat. 2=$ArN=VCl_2N(Et)_2$
Cat. 3=$ArN=VCl_2N(Et)(Ph)$
Cat. 4=$ArN=VCl_2N(Ph)_2$
Cat. 5=$ArN=VCl_2$-carbazilido
Cat. 6=$ArN=VCl_2$-(N-ethyl) 2,4 dichloroanilido
DCPAE=dichlorophenylacetic ethyl ester
SEAC=ethylaluminium sesquichloride
$C_3$ cont.=weight content of propylene units in the polymer
Yield=either the yield in grams of polymer (g) or in kilograms per gram of transition metal (kg/g of M).
where AR=o,o diisopropylphenyl
Ph=phenyl
Et=ethyl Comparative Experiment A A 1-liter glass autoclave was filled with 400 ml of petrol and 0.1 mmole of SEAC. The reactor was brought to a pressure of 8 bar with the aid of purified monomers and was conditioned so that the propylene:ethylene ratio in the gas cap was 2:1. The temperature of the reactor was 30° C. Then 0.006 mmole of cat. 1, immediately followed by 0.025 mmole of DCPAE, was added to the contents of the reactor. During the polymerization the concentrations of the monomers were kept constant as much as possible by supplying propylene (200 nl/hr) and ethylene (100 nl/hr) to the reactor. After 10 minutes' polymerzation no reaction was observed any more and the reactor was depressurized, the solution was collected and dried. An amorphous copolymer of ethylene and propylene was obtained. See Table 1 for the results obtained.

Example I

The same polymerization setup as in Comparative Experiment A was used. Now a transition metal-imidoaryl complex according to the invention, notably cat. 2, was used as the catalyst component. The reaction conditions were the same as those of Comparative Experiment A. The catalyst remained active with time; after 60 minutes' polymerization the reactor was depressurized and an amorphous polymer was obtained.

Example II

Example I was repeated, only now using cat. 3 as the catalyst component. The catalyst showed stable polymerization behaviour with time; after 50 minutes' polymerization the reaction was stopped by depressurizing the reactor.

Examples III-V

Example I was repeated using cats. 4, 5 and 6, respectively, and a polyerization time of 60 minutes. The results (shown in Table 1) manifestly show that a considerable improvement of the activity and stability is obtained with a catalyst according to the invention. This is clearly apparent from the increase in the yield of polymer per gram of transition metal. In addition, the diarylamido ligand appears to yield a more active catalyst than the dialkylamido ligand or the alkylarylamido ligand. The increase in the activity of the catalyst causes a corresponding and proportionate decrease in the concentration of transition metal in the prepared polymer (a factor of 10 going from Comparative Experiment A to Example III).

TABLE 1

| Example No. | catalyst (mmol) | SEAC (mmol) | DCPAE (mmol) | yield (grams) | $C_3$ cont. (wt. %) | yield (kg/g of M) |
|---|---|---|---|---|---|---|
| A | 0.006 | 0.2 | 0.025 | 10 | 39 | 31 |
| I | 0.004 | 1.0 | 0.025 | 17 | 40 | 83 |
| II | 0.003 | 0.5 | 0.025 | 14 | 39 | 98 |
| III | 0.002 | 0.5 | 0.025 | 38 | 45 | 330 |
| IV | 0.004 | 0.5 | 0.025 | 16 | 35 | 78 |
| V | 0.006 | 0.5 | 0.025 | 18 | n.a. | 59 | n.a. = not analyzed

We claim:

1. A catalyst suitable for the preparation of an olefin polymer, comprising an organometallic compound and a transition metal-imidoaryl complex wherein the transition metal-imidoaryl complex contains at least one amido group bound to the transition metal, the aryl group in the transition metal-imidoaryl complex is a 2,6-di-$C_1$-$C_{20}$-alkylsubstituted phenyl group, and the transition metal is a metal from groups 3–6 of the Periodic Table.

2. A catalyst according to claim 1, wherein said aryl group is a 2,6-di-$C_1$-$C_8$ alkylsubstituted phenyl group.

3. A catalyst according to claim 2, wherein in said 2,6-di-$C_1$-$C_8$ alkylsubstituted phenyl group the alkyl substituents are selected from the group consisting of methyl, ethyl, isopropyl, and isobutyl.

4. A catalyst according to claim 1, herein said aryl group in the complex is a 2,6-dimethyl phenyl group or a 2,6-diisopropyl-phenyl group.

5. A catalyst according to claim 1, wherein said aryl group in the complex is a 2,6-dimethyl-phenyl group.

6. A catalyst according to claim 1, wherein said aryl group in the complex is a 2,6-diisopropyl-phenyl group.

7. A catalyst according to claim 1, wherein in said 2,6-di-$C_1$-$C_{20}$-alkylsubstituted phenyl group the phenyl is substituted on at least one of the meta or para positions by a member selected from the group consisting of alkyl, aralkyl, amino, nitro, thiol, carboxy, alkoxy, araloxy, and halide.

8. A catalyst according to claim 1, wherein said transition metal is selected from the group consisting of Ti, Zr, V, Nb, Cr, and Mo.

9. A catalyst according to claim 8, wherein said transition metal is Ti or V.

10. A catalyst according to claim 1, wherein in said transition metal-imidoaryl complex the transition metal is vanadium.

11. A catalyst according to claim 1, wherein said amido group is represented by the formula —$NR_1R_2$, wherein $R_1$ and $R_2$, independent of one another, are an alkyl group, an alkenyl group, an aryl group, or a silicon-containing hydrocarbyl group.

12. A catalyst according to claim 11, wherein $R_1$ and $R_2$ independently represent an aryl group.

13. A catalyst according to claim 12, wherein each of $R_1$ and $R_2$ is a phenyl group.

14. A catalyst according to claim 11, wherein $R_1$ and $R_2$ are a $C_1$-$C_8$ alkyl or alkenyl group.

15. A catalyst according to claim 11, wherein $R_1$ and $R_2$, independent of one another, contain 1 to 20 carbon atoms.

16. A catalyst according to claim 11, wherein $R_1$ and $R_2$ are independently selected from the group consisting of methyl, ethyl, isopropyl, vinyl, 1-propenyl, allyl, 1,3-butadienyl, tolyl, phenyl, naphthalyl, trimethylsilyl, triethylsilyl, and dimethylethylsilyl.

17. A catalyst according to claim 1, wherein said organometallic compound contains aluminum.

18. A catalyst according to claim 17, wherein said organometallic compound is at least one member selected from the group consisting of a trialkylaluminum compound, an aikylaluminum hydride, and an alkylalkoxyaluminum compound.

19. A catalyst according to claim 1, wherein said organometallic compound is an organometallic compound of at least one metal selected from the group consisting of sodium, lithium, zinc, aluminum and magnesium.

20. A catalyst according to claim 1, wherein said organometallic compound is an organometallic compound of at least one member selected from the group consisting of amylsodium, butyllithium, diethylzinc, butylmagnesium chloride, dibutylmagnesium, triethylaluminum, diisobutylaluminum hydride, diethylaluminum chloride, diisobutylaluminum chloride, monoethylaluminum dichloride, and ethylaluminum sesquichloride.

21. A catalyst according to claim 1, wherein said catalyst further comprises a promoter.

22. A catalyst according to claim 21, wherein said promoter contains at most two halogen atoms per molecule.

23. A catalyst according to claim 1, wherein said catalyst further comprises a Lewis acid or a Lewis base.

24. A process for preparing an olefin polymer which comprises conducting the polymerization of at least one olefin in the presence of a catalyst according to claim 1.

25. A process according to claim 24, wherein the olefin is at least one selected from the group consisting of an alpha-olefin, a non-terminal olefin, and a diolefin.

26. A process according to claim 25, wherein said olefin is at least one selected from the group consisting of ethylene, propylene, butylene, pentene, and heptene.

27. A process according to claim 24, wherein said olefin is ethylene, propylene, or a mixture thereof.

28. A process according to claim 24, wherein said olefin polymer is a rubbery polymer comprised of ethylene, propylene and optionally a diene.

29. A process according to claim 24, wherein said at least one olefin is ethylene and at least one member selected from the group consisting of propylene, 1-butylene, 1-pentene, 1-hexene, 1-octene, 4-methyl-1-pentene, styrene, and alpha-methylstyrene.

30. A process according to claim 24, wherein said olefin is at least one member selected from the group consisting of ethylene, propylene and an aliphatic or acyclic compound having at least two C=C bonds and from 3 to 20 carbon atoms.

31. A process according to claim 30, wherein said aliphatic or acyclic compound having at least two C=C bonds is selected from the group consisting of 1,3-butadiene, isoprene, 2,3-dimethyl-1,3-butadiene, 2-ethyl-1,3-butadiene, piperylene, myrcene, allene, 1,2-butadiene, 1,4,9-decatriene, 1,4-hexadiene 1,5-hexadiene, 4-methyl-1,4-hexadiene, 5-(2'-methyl-2'-butenyl)-2-norbornene, and 5-(3'-methyl-2'-butenyl)-2-norbornene.

32. A process according to claim 30, wherein said aliphatic or acyclic compound having at least two C=C bonds is at least one member selected from the group consisting of dicyclo-pentadiene, 5-methylene-2-norbornene, 5-ethylidene-2-norbornene and 1,4-hexadiene.

33. A process according to claim 24, wherein the olefin is at least one member selected from the group condsisting of ethylene, propylene and a compound having at least two C=C bonds which is at least one 5-alkylidene-2-norbornene wherein the alkylidene substituent contains 1–20 carbon atoms.

34. A catalyst comprising a transition metal-imidoaryl complex represented by the formula

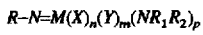

wherein

R represents a 2,6-dialkylsubstituted phenyl group,

M represents a transition metal from groups 3–6 of the Periodic Table,

X represents a halogen atom,

Y represents an alkoxy group, an amido group, or a silicon containing hydrocarbyl group, $R_1$ and $R_2$ contain up to 20 carbon atoms and, independent of one another, represent an alkyl group, an alkenyl group, an aryl group, or a silicon-containing hydrocarbyl group, n is an integer and is 0 to 2, m is an integer and is 0 to 2, p is an integer and is 1 to 3, and R–N=represents an imidoaryl ligand.

35. A catalyst according to claim 34, wherein the transition metal is selected from the group consisting of Ti, Zr, V, Nb, Cr, and Mo.

36. A catalyst according to claim 35, wherein said 2,6-dialkylsubstituted phenyl group is a 2,6-di-$C_1$-$C_8$-alkylsubstituted phenyl group.

37. A catalyst according to claim 35, wherein n is 1 or 2.

* * * * *